July 15, 1958 H. C. HUNT 2,843,236

POWER TRANSMISSION UNIT

Filed March 9, 1955 4 Sheets-Sheet 1

INVENTOR.
HARRY C. HUNT
BY Leon Edelson
ATTORNEY

July 15, 1958 H. C. HUNT 2,843,236

POWER TRANSMISSION UNIT

Filed March 9, 1955 4 Sheets-Sheet 2

INVENTOR.
HARRY G. HUNT
BY
*[signature]*
ATTORNEY

July 15, 1958 H. C. HUNT 2,843,236
POWER TRANSMISSION UNIT
Filed March 9, 1955 4 Sheets-Sheet 3
FIG. 3
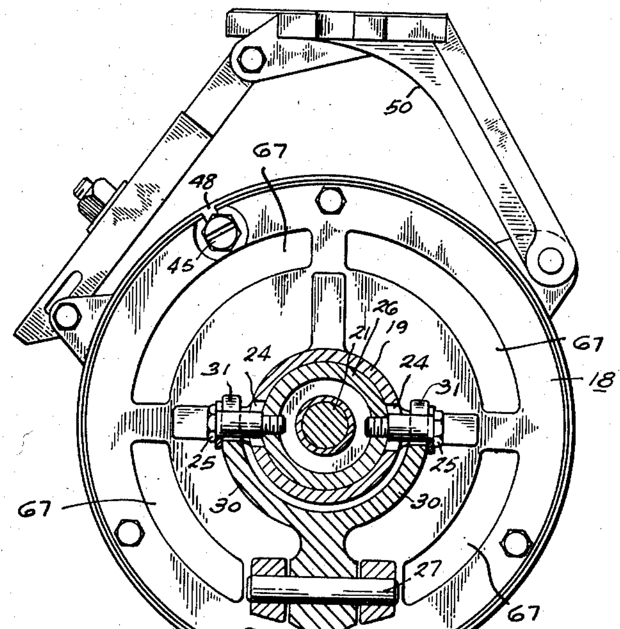
FIG. 7
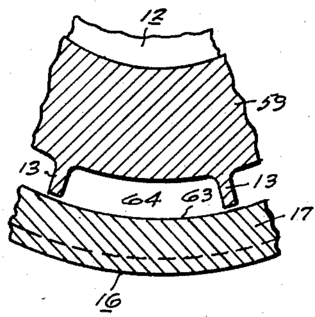
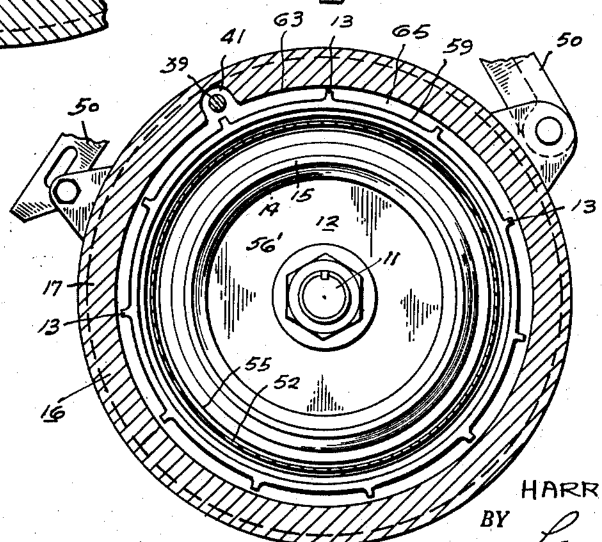
FIG. 5
INVENTOR.
HARRY C. HUNT
BY
Lew Edelson
ATTORNEY

POWER TRANSMISSION UNIT

Filed March 9, 1955 4 Sheets-Sheet 4

INVENTOR.

HARRY C. HUNT

BY Lea Edelson

ATTORNEY

United States Patent Office 2,843,236

Patented July 15, 1958

2,843,236

POWER TRANSMISSION UNIT

Harry C. Hunt, Reading, Pa., assignor to American Safety Table Company, Inc., Reading, Pa., a corporation of Pennsylvania Application March 9, 1955, Serial No. 493,262

6 Claims. (Cl. 192—18)

This invention relates generally to apparatus for the transmission of power from a continuously operated motor to an intermittently operated utility, and more particularly to certain improvements in that type of apparatus which is the subject of United States Letters Patent No. 2,703,369, issued to Max T. Voigt on March 1, 1955.

The apparatus embodying the present invention is a compact organization which essentially comprises an electric motor, a housing which incloses the motor, and means shiftable in one direction axially of the motor to a position wherein it is clutched to the motor for driving the utility, and in the opposite direction to a position wherein it is declutched from the motor and engages stationary means for arresting or braking the operation of the utility.

A principal object of the present invention is to provide the apparatus of the present invention with means operative to positively induce a flow of air through the housing aforesaid and additionally with an enclosure for the shiftable means aforesaid, all for the purpose of maintaining such shiftable means free from any harmful accumulation of air-borne dirt or lint.

Other objects and advantages of the present invention will appear more fully hereinafter, it being understood that the invention consists substantially in the combination, construction, location and relative arrangement of parts, all as described in detail hereinafter, as shown in the accompanying drawings, and as finally pointed out in the appended claims.

In the accompanying drawings, which illustrate apparatus constructed in accordance with and embodying the general principles of the present invention;

Figure 1:
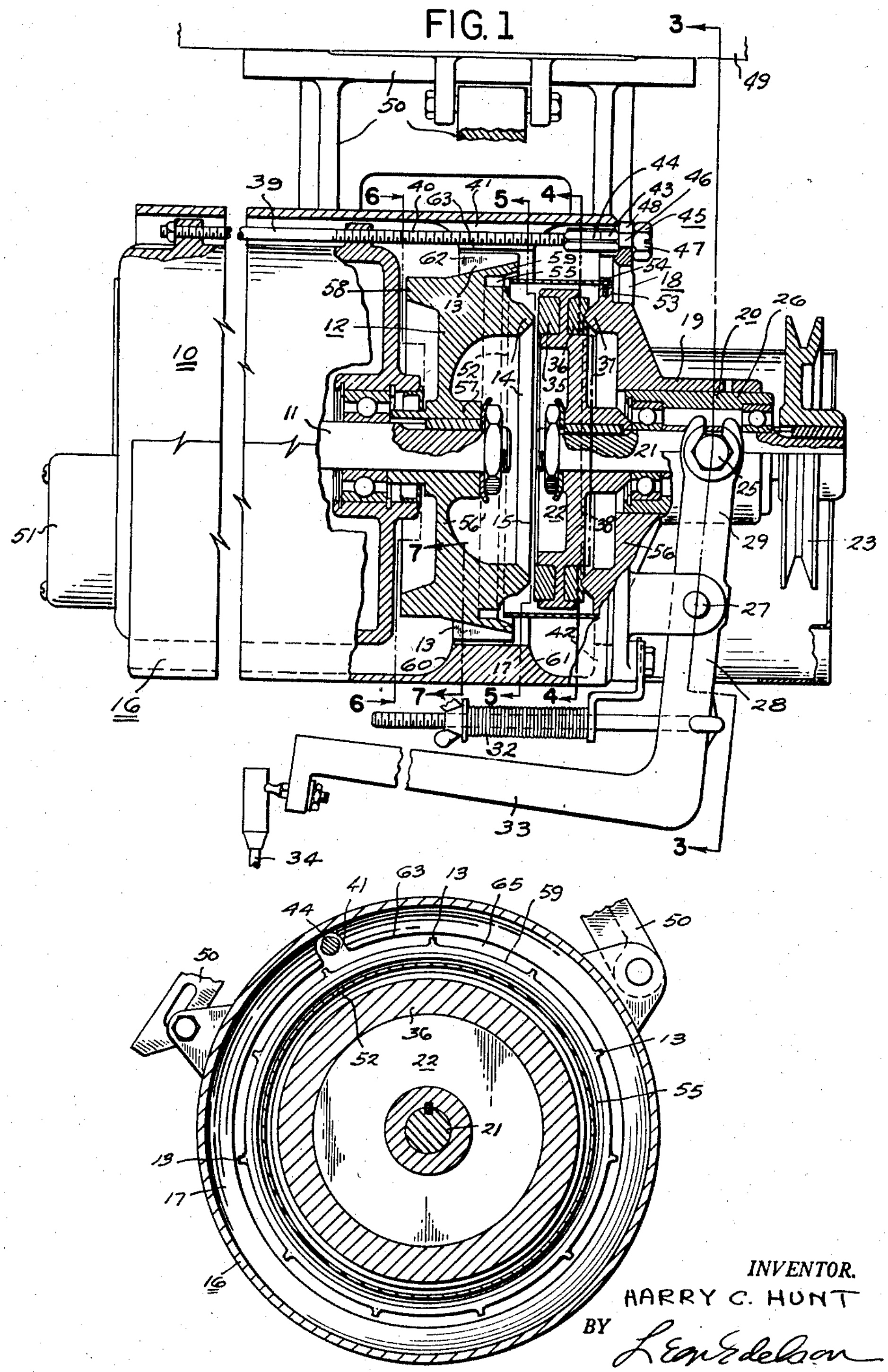
Figure 1 is a side elevation, partly in section, of one form of apparatus embodying the present invention, the axially shiftable clutching and braking unit being shown declutched from the motor, in arresting or braking position.
Figures 8, 9, 10:
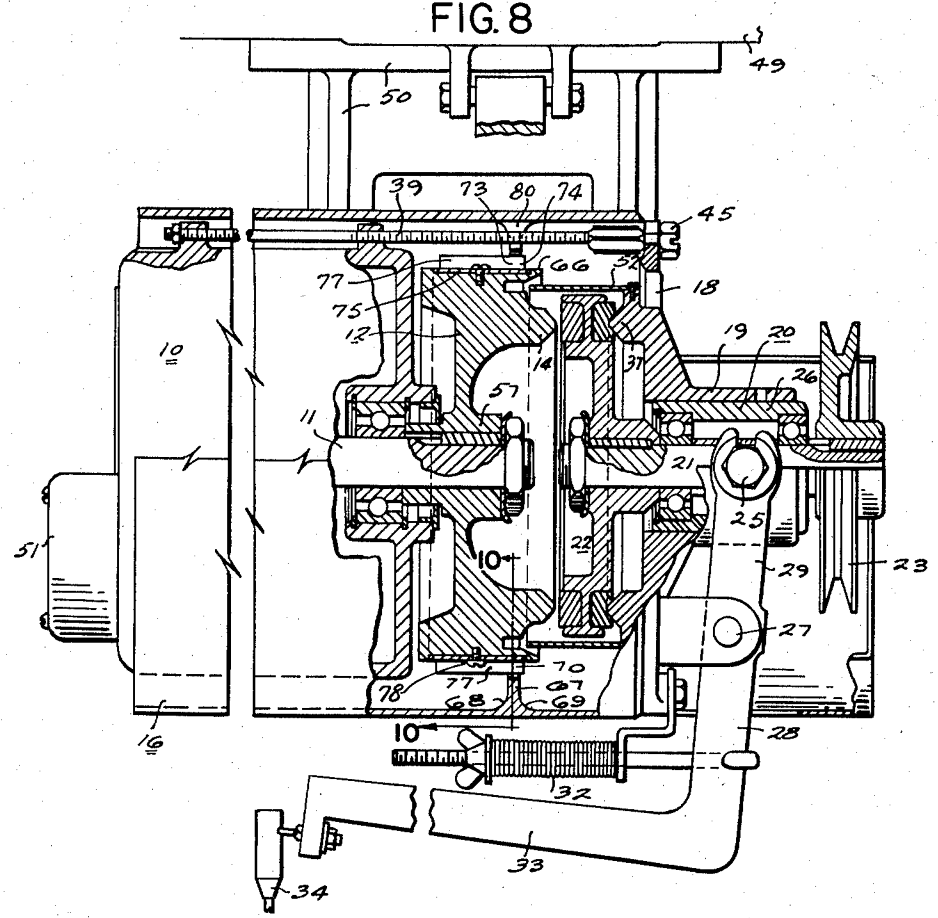

Figures 3, 4, 5 and 6 are sections taken respectively on lines 3—3, 4—4, 5—5 and 6—6 of Figure 1;

Figure 7 is an enlarged section taken on line 7—7 of Figure 1;

Figure 8 is the same as Figure 1, but shows another form of apparatus embodying the present invention;

Figure 9 is a perspective view of the vane or impeller mounting collar shown in Figure 8 mounted on the motor flywheel; and Figure 10 is an enlarged section taken on line 10—10 of Figure 8.

Referring to the drawings, and particularly to Figures 1 through 7, the apparatus of the present invention includes an electric motor 10, the shaft 11 of which is extended to receive a flywheel 12, this flywheel being suitably keyed or locked to the motor shaft for rotation therewith. Extending radially outwardly from the face of the flywheel are a plurality of circumferentially spaced vanes or impellers 13, and formed on the side of the flywheel remote from the motor is an annular rib 14 of generally triangular shape in transverse cross section to provide it with an edge 15.

The motor 10 and its associated flywheel 12 are mounted as an assembly within a supporting housing 16 of generally cylindrical shape, this housing 16 being of a length somewhat greater than the over-all length of the motor and flywheel assembly. Formed interiorly of the housing as integral elements thereof are a plurality of circumferentially spaced ribs (not shown) extending longitudinally of the housing, these ribs serving to space the motor concentrically with the housing. Likewise formed interiorly of the housing as an integral part thereof is an annular rib 17 disposed in embracing relation with respect to the flywheel 12 and the several impellers 13.

The motor housing 16 is suitably slit to form a pair of wings (not shown) which are adapted to be drawn together to clamp the motor securely within the housing 16 in a selected position axially of the housing, with the flywheel centered in the housing and free to rotate.

Suitably secured to the rear or flywheel end of the housing 16 is a centrally apertured end plate 18 which carries a rearwardly projecting cylindrical journal box 19. Slidably fitted within this journal box 19 is a ball-bearing assembly 20 within which is rotatably journalled a shaft 21 to the oppositely projected ends of which are respectively secured a clutch disc 22 and a belt pulley 23. The journal box or housing for the ball-bearing assembly is provided at diametrically opposite sides thereof with openings 24—24 through which respectively project a pair of studs 25—25 suitably secured to opposite sides of the external sleeve 26 of the ball-bearing assembly. The clutch disc 22 and the belt pulley 23 are each nonrotatably secured to the shaft for rotation therewith, and the clutch disc 22, belt pulley 23, shaft 21 and the ball-bearing assembly 20 are axially shiftable as a unit within the relatively stationary journal box or housing 19 by the means presently to be described.

Pivotally secured to the end plate 18 of the motor housing 16, as at 27, is a clutch-actuating lever 28, this lever being provided at its upper end with a yoke portion 29 having laterally spaced arms 30—30 adapted to embrace therebetween the journal box 19 these arms 30—30 being each provided with a slotted terminal end 31 for engagement with a stud 25 projecting outwardly through the opening 24 in the side wall of the journal box. The lever 28 is under the influence of a compression spring 32 which normally holds the lever in its position as shown in Figure 1, in which position the clutch disc 22 is disengaged from the flywheel of the motor 10. The lower arm 33 of the pivoted lever is suitably connected, as by a link or rod 34, to a foot treadle or the like (not shown) for actuation of the lever, it being apparent that a downward pull upon the link or rod 34 shifts the yoke portion 29 of the lever forwardly toward the motor and so causes the clutch disc 22 to engage the motor flywheel as shown in Figure 2.

Figures 2, 6:
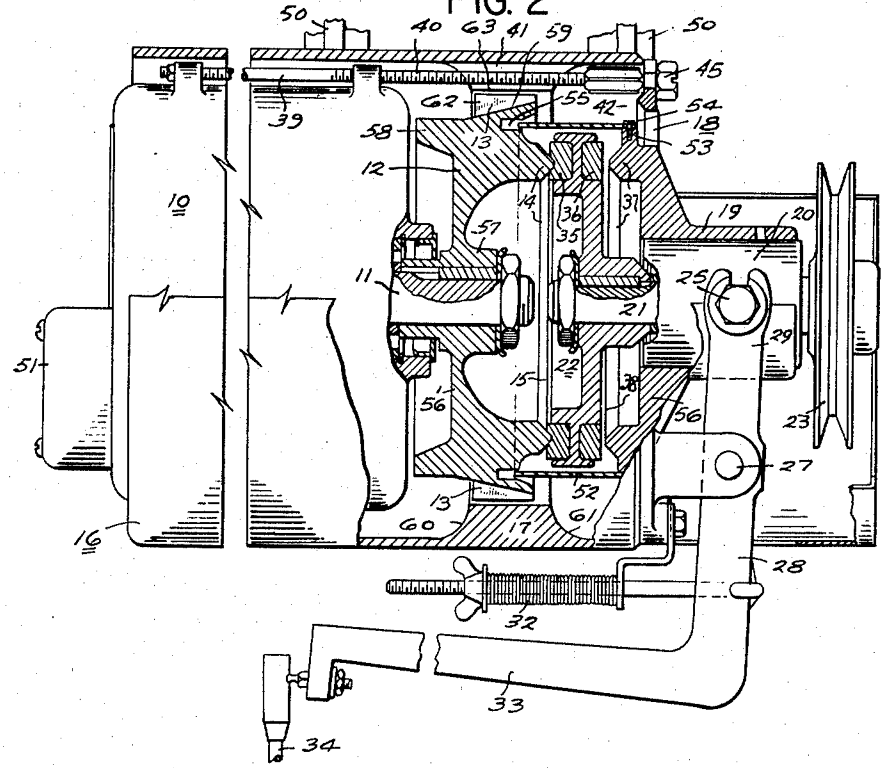
Figure 2 is the same as Figure 1 but shows the clutching and braking unit clutched to the motor.

As most clearly appears in Figures 1, 2 and 4, the clutch disc 22 is provided adjacent its peripheral edge with a pair of oppositely facing annular friction discs 35 and 36 of cork or other suitable resilient material, the disc 35 being adapted to engage the annular rib 14 of the motor flywheel 12 while the disc 36 is adapted to engage an annular rib 37 formed upon the inner face of the end plate 18 of the motor housing 16. The annular rib 37 is similar to the annular rib 14 in that it likewise is of generally triangular shape in transverse cross section to provide it with an edge 38.

The cylindrical housing 16 for the motor 10 serves not only as a support for maintaining the motor and clutch mechanism in axial alinement, but also as a means for adjusting the motor axially toward or away from the clutch mechanism to insure accurate spacing between the rib 14 of the revoluble flywheel 12 and the rib 37 of the stationary end plate 18. To effect this adjustment, it is merely necessary to loosen the wing portions of the housing sufficiently to permit axial adjustment of the motor within the housing to present the motor flywheel in proper spaced relation to the end plate 18, whereupon these wing portions are again drawn tight to securely maintain the motor and its associated clutch mechanism in their proper relation.

In order to conveniently and quickly effect axial adjustment of the motor within its housing 16, one of the stay bolts which are conventionally employed to secure together the end bells of the motor casing is replaced by a bolt 39 of considerably greater length than that of the conventional bolt. This bolt 39 extends between the end bells of the motor casing to secure the same together and is provided with a freely projecting threaded portion 40. This freely projecting threaded portion of the bolt 39 extends through a guide notch 41 suitably formed in the internal annular rib 17 of the housing 16. The rear end of the motor housing 16 is provided with an inwardly presenting annular flange 42 against the rear face of which is disposed the marginal edge of the end plate 18. This end flange 42 of the housing 16 is notched, as at 43, in registry with the guide notch 41 formed in the internal rib 17 of the housing, the notch 43 being adapted to receive the barrel portion 44 of a nut which is revolubly mounted in the end plate 18 for threaded engagement with the threaded end of the elongated bolt 39. This nut, designated generally by the numeral 45, is intermediately provided with a constricted neck portion 46, with a tool engaging outer end portion 47 and with the inwardly projecting barrel portion 44 which is interiorly threaded to receive the end of the bolt 39.

The constricted neck portion 46 of the nut 45 is rotatably received within a notch 48 suitably formed in the peripheral edge of the end plate 18 in substantial registry with the notch 43 formed in the end flange 42 of the housing 16. The nut 45, being thus restrained against axial movement relative to the end plate 18, rotation about its own axis in one direction or the other effects axial shifting of the bolt 39 with which it is threadedly engaged and so serves as an effective means for shifting the motor 10 and its associated flywheel 12 as a unit axially of the housing 16. Of course, preliminarily to manipulating the nut 45 to effect shifting of the motor 10 and its associated flywheel 12, the wing portions of the housing 16 are loosened to relax the grip of the housing upon the motor 10.

The sewing machine or other utility (not shown) adapted to be driven by the power transmitting apparatus of the present invention is mounted upon a table designated 49, while the power transmitting apparatus is suspended below the table 49 through the medium of a bracket designated generally by the numeral 50. Suitable means, of which only the motor mounted receptacle 51 is shown, is provided for supplying the motor with electric power for continuous operation thereof, the clutch mechanism being operable to translate the continuous operation of the motor and flywheel into intermittent operation of the sewing machine through the medium of a belt (not shown) suitably trained over the belt pulley 23.

When the atmosphere in the vicinity of the sewing machine or other utility could be more or less laden with dirt or lint which might lodge between the flywheel 12 and the clutch disc 22 and/or between the latter and the end plate 18 of the housing 16 in amounts sufficient to seriously interfere with the proper operation of the combination clutch and brake mechanism, it is very desirable to make some provision thereagainst. Having in mind the foregoing, the present invention provides improved means operative to positively induce a flow of air through the motor housing 16, and additionally an enclosure for the clutch disc 22. The latter includes a cylindrical cover 52 which extends about the clutch disc 22 and axially between the flywheel 12 and the end plate 18 of the housing 16. One end portion of the cover 52 is fitted over a radially extending annular flange 53 which is formed on the end plate 18 of the housing 16, and which extends about the rib 37. The cover 52 is carried by the end plate 18, and, when secured thereto, as by studs designated 54, it is disposed concentrically relative to the clutch disc 22, which is adapted to rotate freely therewithin. The flywheel 12 is provided on the side thereof remote from the motor 10 with an annular groove 55 which extends about the rib 14 formed on the flywheel 12, this groove being adapted to freely receive the opposite end portion of the cover 52, as may be required when the motor and flywheel assembly are axially adjusted within the motor housing 16. The annular webs 56 and 56' extending radially respectively from the journal box 19 and from the hub 57 of the flywheel 12 are free of openings through which dirt or lint might pass, and it will be apparent that the flywheel 12, end plate 18 of the housing 16, and the cover 52 conjointly form a dirt and lint excluding housing for the clutch disc 22, effective to guard against the introduction of dirt and lint between the flywheel and clutch disc and/or between the latter and the end plate 18, and against the accumulation of dirt and lint in amounts sufficient for seriously interfering with the operation of the combination clutch and brake mechanism. It will be understood, of course, that the housing for the clutch disc 22 can be variously constructed. For example, this cover 52, instead of being made of imperforate sheet material, can be made of a suitably fine mesh wire fabric, instead of being carried by the end plate 18 of the housing 16, can be carried by the flywheel 12, and instead of being made in one section, can be made in two sections carried respectively by the flywheel 12 and the end plate 18 of the housing 16.

Still referring particularly to Figures 1 through 7, immediately adjacent the motor 10, the flywheel 12 is provided with a section 58 which is uniform in diameter throughout its axial extent, and contiguous to the section 58, on the side thereof remote from the motor 10, the flywheel 12 is provided with a section 59 of increased axial extent which is axially tapered or flared so as to uniformly increase in diameter from the section 58 to the side of the flywheel remote from the motor 10, being conically shaped. The annular rib 17 provided interiorly of the housing 16 is disposed in concentric relation to the flywheel 12 and in embracing relation to a major portion of the conically shaped section 59 of the flywheel 12, being of uniform inside diameter throughout an axial extent which is quite substantial, and being flanked by a pair of oppositely presenting large radius annular fillets 60 and 61. There is thus formed an axially extending annular passage for air, designated 62, between the rim of the flywheel 12 and the embracing portion of the housing 16, the outer wall of the air passage being the inner surface, designated 63, of the housing's annular rib 17, and the inner wall of the air passage being the tapering surface of the conically shaped flywheel section 59. The air passage is provided with an annular inlet designated 64 which presents toward the motor 10, and with an annular outlet 65 which presents away from the motor, the latter being relatively restricted due to the taper of the flywheel section 59.

The impellers 13 are flat elements of any suitable thickness, which may be integral with or otherwise suitably mounted upon the flywheel section 59, preferably being located respectively in planes that are equally spaced angularly about the principal axis of the apparatus. The impellers 13 are trapezoidal in peripheral outline, corresponding to the shape of a longitudinal section through the passage 62, in which passage the impellers are located. There is only a running clearance between the impellers 13 and the housing's rib 17, and the latter is suitably notched at 41, as already noted, to provide for the projection of the bolt 39 freely therethrough, out of the path of the impellers 13.

In the operation of the apparatus, as the flywheel 12 rotates, in either direction, the impellers 13 circulate within the air passage 62, pressurizing the air therein. The pressurized air being greater in volume at the front end than at the rear end of the passage, air is moved through the passage from front to rear, being admitted through the annular inlet 64, and being expelled through the annular outlet 65, in consequence of which air is drawn into the housing 16 through the front end thereof and over the motor 10, moved through the air passage 62 in the manner aforesaid and over the clutch disc cover 52, after which the air is expelled from the housing 16 through suitable openings 67 formed in the end plate 18 of the housing. The rotation of the flywheel 12 and the consequent circulation of the impellers 13 in the passage 62 positively induces a flow of air through the housing 16 sufficiently abundant to cool the motor 10, and additionally to prevent settling of air-borne dirt and lint within the housing 16. This feature and the manner in which the clutch disc 22 is protectively housed effectively provides against the accumulation of dirt or lint in the vicinity of the clutch disc 22 in amounts sufficient to interfere with the proper operation of the combination clutch and brake unit. It will be understood, of course, that the air passage 62 can be variously constructed. For example, the taper or flare necessary for forming the air passage 62, with the inlet 64 and the restricted outlet 65, may be given partly to the flywheel 12 and partly to the housing's rib 17, or it may be given solely to the latter. In this connection, it will be noted that when the special bolt 39 is not used, the housing's rib 17 is not essential. Moreover, the outer and inner walls of the air passage 62 may be suitably curved axially, instead of being straight. It will be understood also that the impellers can be variously mounted upon the flywheel 12. For example, instead of being circumferentially spaced equally about the flywheel and being arranged parallel to the axis thereof, they may be circumferentially spaced unequally about the flywheel and/or in nonparallel relation to the axis thereof.

Referring particularly to Figures 8 through 10, the improved means operative to positively induce a flow of air through the motor housing is shown in a modified form now to be described. In this latter embodiment of the invention, the circumferentially extending face 66 of the flywheel 12 is uniform in diameter throughout its axial extent. An annular rib 67 provided interiorly of the housing 16 is disposed in concentric embracing relation to the rear end portion of the flywheel 12. This rib 67 is of uniform inside diameter throughout an axial extent which is quite restricted when compared to the axial extent of the face 66 of the flywheel 12 and is flanked by a pair of oppositely presenting large radius annular fillets 68 and 69. There is thus formed an axially extending annular passage for air, designated 70, between the rim of the flywheel 12 and the embracing portion of the housing 16, the outer wall of the air passage 70 being the inner surface, designated 71 of the housing's annular rib 67, and the inner wall of the air passage 70 being the face 66 of the flywheel 12. The air passage 70 is provided with an annular inlet designated 73 which presents toward the motor 10 and with an annular outlet 74 which presents away from the motor.

The flywheel 12 is fitted with a collar designated generally by the numeral 75, which collar comprises a cylindrical member 76 that mounts a plurality of vanes or impellers 77 equally spaced circumferentially about the outside of the cylindrical member 76. These impellers 77 are elongated plate members that are rectangular in transverse cross section, being disposed each with a longitudinally extending edge fitted and secured to the outer surface of the cylindrical member 76, in any suitable manner, as by welding. The impellers 77 extend radially outwardly from and axially of the cylindrical member 76, parallel to one another at an angle of approximately 60 degrees to the central axis of the cylindrical member 76, the front ends thereof (nearest the motor 10) being disposed so as to lead the rear ends thereof (remote from the motor 10) when the rotation of the flywheel (viewed from the rear) is in a counterclockwise direction. The collar 75 is pressed or otherwise suitably fitted upon the flywheel 12, being nested in a groove 77 that extends circumferentially about the rim of the flywheel 12. The cylindrical member 76 is secured against displacement axially of the flywheel 12 by the sidewalls of the groove 77 and is secured against turning in the groove 77 by screws 78 projected through openings 79 formed in the cylindrical member 76 and threaded into the base wall of the groove 77. It will be observed that the outer surface of the cylindrical member 76 is coincident with and may be considered as part of the face 66 of the flywheel. There is only a running clearance between the impellers 77 and the housing's rib 67, and the latter is suitably notched at 80 to provide for the projection of the bolt 39 freely therethrough, out of the impellers 77.

In the operation of the apparatus, the flywheel 12 and the collar 75 rotate together as aforesaid in counterclockwise direction. The air pressure in the region immediately in advance of each impeller 77 increases while the air pressure in the region immediately to the rear of each impeller 77 decreases, in consequence of which air is moved through the passage 70 from front to rear, being admitted through the annular inlet 73, and being expelled through the annular outlet 74. Except as already indicated, the construction and operation of the embodiment of the invention shown in Figures 8 through 10 is the same as already described in connection with the embodiment of the invention shown in Figures 1 through 7. Therefore, a more detailed description of the embodiment of Figures 8 through 10 is deemed unnecessary for a full understanding of the present invention and accordingly is omitted. It will be understood, of course, that should rotation of the flywheel be in a clockwise direction, the impellers 77 must likewise be angled in the opposite direction (so that the front ends of the impellers 77 trail, instead of lead, the rear ends thereof during such clockwise rotation) unless it is desired to reverse the direction of air flow through the passage 70. In addition, instead of being disposed in embracing relation to the rear end portion of the flywheel 12, the annular rib 67 may be disposed in embracing relation to any other portion of the flywheel 12. Furthermore, the axial extent of the annular rib 67 may be materially increased. Still further, the impellers 77 may be formed integral with the rim of the flywheel 12.

It will be understood, of course, that the present invention is susceptible of various changes and modifications which may be made from time to time without departing from the general principles or real spirit thereof, and it is accordingly intended to claim the same broadly, as well as specifically, as indicated in the appended claims.

What is claimed as new and useful is:

1. In an electric power transmission apparatus of the character described, an electric motor mounting a revoluble driving member, stationary clutch support means, a clutch mechanism carried by said support means and having a revoluble clutch disc axially alined with said driving member and disposed between said driving member and support means, said driving member being selectively positionable to vary the distance between said driving member and support means, said disc being axially shiftable in one direction to a position wherein opposed surface portions respectively of said driving member and disc are frictionally engaged and said driving member is effective to turn said disc, and in the opposite direction to a position wherein opposed surface portions respectively of said disc and support means are frictionally engaged and said support means is effective to arrest or brake rotation of said disc, and a cylindrical cover extending about said disc and axially from said support means to said driving member, one end portion of said cover being fixed to said support means, said driving member being telescopically associated with the opposite end portion of said cover and being movable axially relative thereto, said driving member, support means and cover being free of access openings for dirt and lint so as to conjointly form a dirt and lint excluding housing for said disc.

2. In an electric power transmission apparatus of the character described, an electric motor mounting a revoluble driving member, a housing which encloses the motor and driving member, said housing being stationary and said motor and driving member being axially shiftable as a unit within said stationary housing, there being an axially extending passage for air between said driving member and housing, impeller means extending radially outwardly from said driving member into said air passage, a mechanism mounting a revoluble clutching member operable for clutching said driving member, cover means carried by said stationary housing and extending about said clutching member, said cover, driving member, and an area of said stationary housing conjointly forming a dirt and lint excluding housing for said clutching member, the peripheral surface of said driving member and the opposed inner surface portion of said stationary motor housing being disposed in axially tapering relation so as to provide said air passage with an inlet presenting toward said motor and a relatively restricted outlet presenting away from said motor, said impeller means being tapered axially in correspondence to said tapered air passage, and being adapted to circulate within said air passage for drawing air into said stationary motor housing and over said motor, and moving the same through said air passage and over said covering means.

3. In an electric power transmission apparatus of the character described, an electric motor mounting a revoluble driving member, a housing which encloses the motor and revoluble driving member, said housing being stationary and said motor and driving member being axially shiftable as a unit within said stationary housing, there being an axially extending passage for air between said member and housing, impeller means extending radially outwardly from said member into said passage, a clutch mechanism mounting a revoluble clutch disc axially alined with said driving member and axially shiftable relative thereto for clutching the same, cover means carried by said stationary housing and extending around those portions of said driving member and disc adapted for direct engagement when said mechanism is shifted as aforesaid, said cover, driving member, and an area of said stationary housing conjointly forming a dirt and lint excluding housing for said clutch disc, the peripheral surface of said driving member being axially flared outwardly from said motor so as to provide said air passage with an annular inlet presenting toward said motor and a relatively restricted annular outlet presenting away from said motor, said impeller means being tapered axially in correspondence to said air passage, and being adapted to circulate within said air passage for drawing air into said housing and over said motor, and moving the same through said air passage and over said covering means.

4. In an electric power transmission apparatus of the character described, an electric motor mounting a revoluble driving member, a housing extending axially of and enclosing said motor and driving member, there being an axially extending annular air passage intervening said driving member and motor housing, impeller means carried by said driving member and extending axially through and radially across said passage, a mechanism mounting a revoluble driven member operable for clutching said driving member, and cover means extending about said driven clutching member and conjointly with said driving member and a part of said motor housing forming a dirt and lint excluding housing for said driven clutching member, said dirt and lint excluding housing being cross axially of a size smaller than said annular passage, the peripheral surface of said driving member and the opposed inner surface area of said motor housing being disposed in axially tapering relation so as to provide said air passage with an inlet presenting toward said motor and a relatively restricted outlet presenting away from said motor, said impeller means being tapered axially in correspondence to said tapered air passage, and being adapted to circulate within said air passage for drawing air into said motor housing and over said motor, and moving the same through said air passage for discharge thereof over the outer surface of said cover means.

5. In an electric power transmission apparatus of the character described, an electric motor mounting a revoluble driving member, a housing extending axially of and enclosing said motor and driving member, there being an axially extending annular air passage intervening said driving member and motor housing, and elongated impeller means circumferentially spaced about and carried by said driving member and extending axially through and radially across said passage, the peripheral surface of said driving member being axially flared outwardly from said motor so as to provide said air passage with an inlet presenting toward said motor and a relatively restricted outlet presenting away from said motor, the several impeller means being disposed in the outlet end of said passage with only a running clearance intervening said impeller means, throughout substantially all of its effective length, and said motor housing, said impeller means being thereby adapted to circulate within said air passage for drawing air over said motor and moving the same through said air passage.

6. In an electric power transmission apparatus of the character described, an electric motor mounting a revoluble driving member, a housing extending axially of and enclosing said motor and driving member, there being an axially extending annular air passage intervening said driving member and motor housing, and elongated impeller means circumferentially spaced about and carried by said driving member and extending axially through and radially across said passage with only a running clearance intervening said impeller means, throughout substantially all of its effective length, and said motor housing, the several impeller means being similarly angled in the same direction relative to the central axis of said driving member so that for a given direction of rotation of said driving member the leading ends of the several impeller means are adjacent said motor and the trailing ends are remote from said motor, said impeller means being thereby adapted for circulating within said air passage for drawing air over said motor and moving the same through said air passage.

References Cited in the file of this patent

UNITED STATES PATENTS

| | | |
|---|---|---|
| 2,004,055 | Peets et al. | June 4, 1935 |
| 2,481,867 | Peterson | Sept. 13, 1949 |
| 2,739,251 | Ingalls | Mar. 20, 1956 |

FOREIGN PATENTS

| | | |
|---|---|---|
| 558,487 | Germany | Sept. 7, 1932 |